United States Patent
Cloutier

(10) Patent No.: US 6,772,188 B1
(45) Date of Patent: Aug. 3, 2004

(54) METHOD AND APPARATUS FOR COMMUNICATING WITH AN ENTITY AUTOMATICALLY IDENTIFIED IN AN ELECTRONIC COMMUNICATION

(75) Inventor: Jocelyn Cloutier, Menlo Park, CA (US)

(73) Assignee: America Online, Incorporated, Dulles, VA (US)

( * ) Notice: Subject to any disclaimer, the term of this patent is extended or adjusted under 35 U.S.C. 154(b) by 676 days.

(21) Appl. No.: 09/616,422

(22) Filed: Jul. 14, 2000

(51) Int. Cl.[7] ..................... G06F 15/16; G06F 15/173
(52) U.S. Cl. ................. 709/22 A; 709/204; 709/225; 709/229
(58) Field of Search .................... 709/204, 206, 709/245, 225, 223, 224, 226, 229; 707/3, 6

(56) References Cited

U.S. PATENT DOCUMENTS

| | | | | |
|---|---|---|---|---|
| 5,870,549 A | * | 2/1999 | Bobo, II ................. | 709/206 |
| 5,903,723 A | * | 5/1999 | Beck et al. ............. | 709/200 |
| 5,987,508 A | * | 11/1999 | Agraharam et al. .... | 709/217 |
| 6,240,445 B1 | * | 5/2001 | Kumar et al. ........... | 709/206 |
| 6,356,356 B1 | * | 3/2002 | Miller, Jr. et al. ..... | 358/1.15 |
| 6,477,243 B1 | * | 11/2002 | Choksi et al. .......... | 379/100.06 |
| 6,546,005 B1 | * | 4/2003 | Berkley et al. ......... | 370/353 |
| 6,549,612 B2 | * | 4/2003 | Gifford et al. .......... | 379/67.1 |
| 6,654,815 B1 | * | 11/2003 | Goss et al. ............. | 709/248 |
| 6,678,719 B1 | * | 1/2004 | Stimmel ................. | 709/204 |

* cited by examiner

Primary Examiner—Jack B. Harvey
Assistant Examiner—Tam T. Phan
(74) Attorney, Agent, or Firm—Glenn Patent Group; Michael A. Glenn

(57) ABSTRACT

A system and method for receiving an electronic communication containing an identifier or indicia of an entity and, in response to a user's selection of the identifier, initiating communication between the user and the entity. Upon receipt of the electronic communication (e.g., document, electronic mail message, sound file), the system scans or parses it to locate one or more entity identifiers. An entity identifier may be a telephone number, electronic mail address, network address, name or virtually any other indicia that may serve to identify the entity. When a user selects an entity identifier, the system offers one or more methods of communicating with the associated entity, which methods may depend on the form of the entity identifier (e.g., a telephone number) and/or a preference specified by the user. The system initiates the selected form of communication in response to the user's selection.

15 Claims, 2 Drawing Sheets

METHOD AND APPARATUS FOR COMMUNICATING WITH AN ENTITY AUTOMATICALLY IDENTIFIED IN AN ELECTRONIC COMMUNICATION

BACKGROUND

This invention relates to the fields of computer systems and communications. More particularly, a system and methods are provided for automatically recognizing indicia such as telephone numbers, electronic mail addresses and the like and enabling various forms of communication with an entity associated with the indicia.

Electronic communications (e.g., documents, multimedia files, web pages) often contain indicators or identifiers associated with people, places and other entities. For example, electronic mail messages and textual documents often contain telephone numbers, electronic mail addresses, names of people or businesses, etc. A person accessing an electronic communication may wish to contact the entity associated with an identifier. But, unless the person already knows a method of establishing contact (e.g., via an electronic mail address or telephone number), he or she may have to do some research or initiate another communication in order to determine how to make contact.

Click2Dial by AT&T provides one method by which someone accessing an electronic communication can contact a person or business whose telephone number is included in the communication. In particular, with Click2Dial the person accessing the communication may click on the telephone number and the Click2Dial system will facilitate the creation of a telephonic voice connection with the entity. However, this system requires the telephone number to be coded or represented in a specific manner, and the application used to access the communication must recognize that coding and interpret it appropriately. More particularly, Click2Dial cannot automatically recognize an uncoded telephone number or other entity identifier and enable a person to communicate with the entity.

A product commercially available under the name "FlySwat" provides a browser plug-in that makes pre-determined sequences of characters (e.g., words) "clickable" by a person using a web browser. The person may click on the sequence and be presented with an option such as to view a map of a geographical area identified by the sequence (e.g., a city or point of Interest). This system requires the sequences to be pre-specified and, in addition, does not enable communication with an entity associated with a sequence.

What is needed then is a system and method for automatically identifying an entity identifier or indicia (e.g., telephone number, electronic mail address, name) in an electronic communication (e.g., an electronic mail message, a word processing document, a spreadsheet, an audio file) and, in response to a user's selection of the identifier, enabling one or more forms of communication with the entity.

SUMMARY

In one embodiment of the invention a system and methods are provided for scanning an electronic communication and identifying an identifier or indicia of a person, business or other entity. When such an identifier is located, it is transformed to make it selectable. When a user selects the identifier he or she may be presented with a menu of one or more methods of communicating with an entity associated with the identifier.

For identifiers such as telephone numbers, electronic mail addresses and other indicia having predictable patterns, the system may apply a set of heuristics or rules to identify or select them. Other indicia may be identified because they match pre-determined patterns or are associated with entities (e.g., people, customers) known to the system. Further, in one embodiment of the invention a user may interactively identify a portion of a communication as being associated with an entity. In this case the system may apply additional processing measures (e.g., database lookup, network search) to learn means of communicating with the entity.

In different embodiments of the invention, in response to a user's selection the user may be presented with options to establish a voice link with the selected entity (e.g. via telephone or VoIP (Voice over Internet Protocol)), send a voicemail message or an electronic mail message, send a facsimile, perform a lookup or reverse lookup (e.g., of a telephone number), etc.

DETAILED DESCRIPTION

Figure 1:
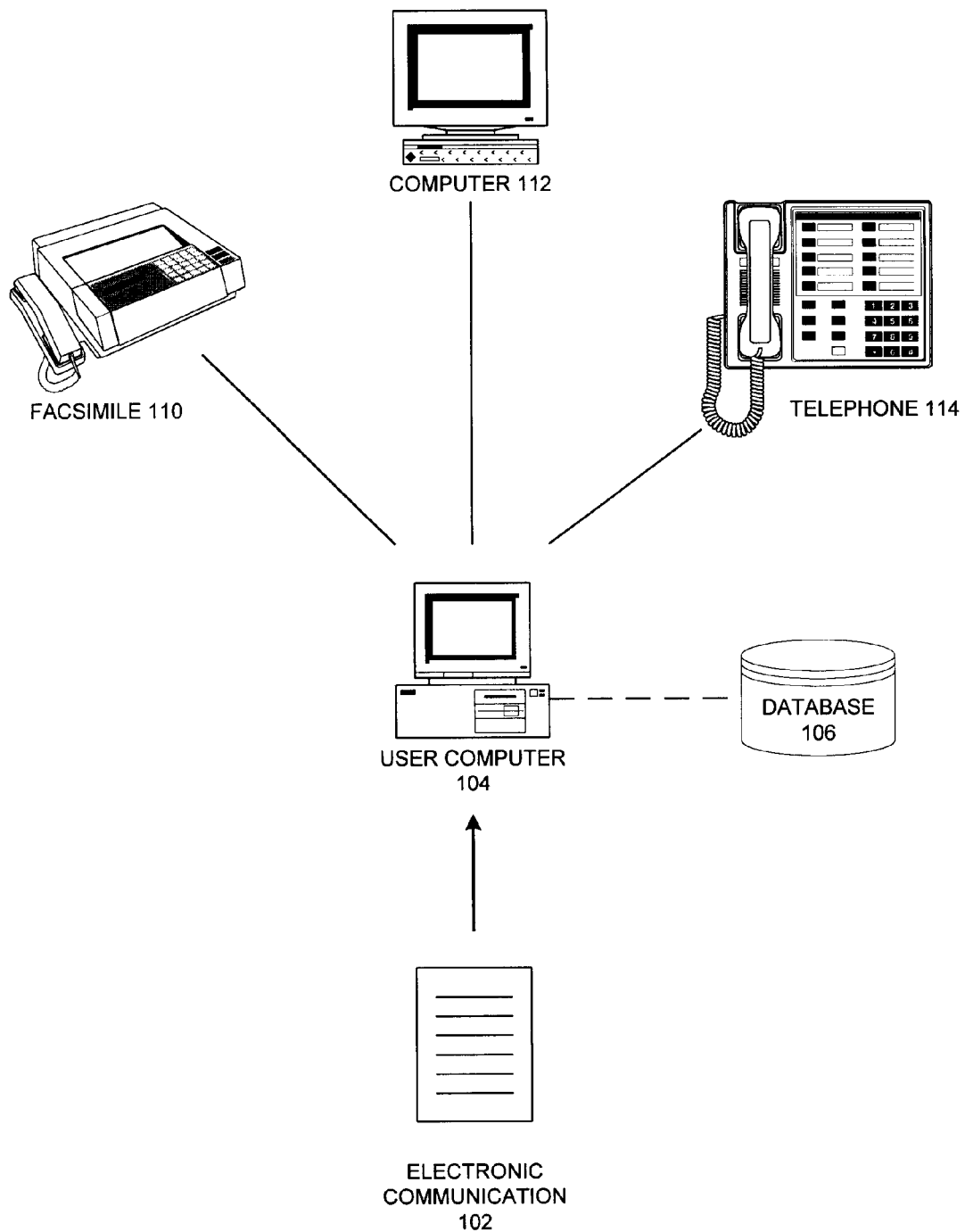
FIG. 1 is a block diagram depicting a system for initiating contact between a computer user and another entity in response to the user's selection of an entity identifier that was automatically recognized in an electronic communication received by the user, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) are omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention a system and methods are provided for initiating contact between a computer user and another entity (e.g., a person, a business) in response to the user's selection of some indicia or identifier of the entity within an electronic communication. In this embodiment the user may be operating a web browser or other application (e.g., word processor, spreadsheet) or tool to access or view an electronic communication such as an electronic mail message, a document, an audio file, etc. For example, the system may include a plug-in to the user's browser or electronic mail application, a macro that operates within a word processing or spreadsheet application, a proxy module configured to intercept HTML (Hyper Text Markup Language) files received at the user's computer, etc.

When an electronic communication is received at the user's computer, it is scanned in order to locate entity indicia or identifiers matching certain rules or pre-determined patterns. For example, a telephone number or numeric network address may be recognized by detecting a sequence of digits; an electronic mail address or web site identifier may be recognized by its syntax; a name or other identifier may match an entry in a database of entities that may be of interest to the user, etc. When an entity identifier is recognized, it is made selectable or "clickable" by invoking the appropriate programming tools or functions for the operating system, application or user interface. Then, if the user selects or clicks on the identifier, a menu or list of options may be presented.

Depending on the type of entity identifier (e.g., telephone number, network address, electronic mail address, name), different options may be presented. Illustrative options may include, but are not limited to, initiating a voice communication or voicemail message, sending a facsimile or electronic mail message, performing a lookup on the identifier to retrieve additional information, or executing some other function or operation.

FIG. 1 depicts a computing environment in which one embodiment of the invention may be practiced. The configuration of the system depicted in FIG. 1 is merely illustrative; embodiments of the invention may also be implemented in other environments having varying degrees of similarity to that of FIG. 1.

In FIG. 1, electronic communication 102 is received or generated on user computer 104. Electronic communication 102 may comprise any form of information or data, including audio, video, text, etc. Computer 104 may be a desktop, laptop, hand-held or other computing device capable of initiating communication with another device. On computer 104 an application, tool or other set of instructions are executed to scan communication 102 for sequences of characters (e.g., text, numerals) or signals (e.g., sounds, pictures) matching a predetermined pattern (e.g., a name of a person, place, business) or having a particular structure (e.g., of a telephone number or electronic mail address).

Computer 104 may access database 106 to retrieve a predetermined pattern or structure. Database 106 may be part of computer 104 or may be separate from it; in one embodiment database 106 is part of a data server electronically coupled to computer 104. In other embodiments of the invention database 106 may be coupled to a network or other communication link accessible to computer 104 or may be part of a PIM (Personal Information Manager), contact list or other electronic compendium of contact information.

Identified sequences are then made selectable for a user operating computer 104. In one embodiment of the invention the user may be able to request that the application or tool operating on user computer 104 perform additional processing on a user-specified or user-identified sequence. Through such additional processing, the system may be able to retrieve (e.g., from database 106) an entity identifier or other useful information concerning the user-specified sequence.

After the user chooses a selectable sequence and a communication option offered by the system, computer 104 may initiate a communication to a variety of devices, including facsimile 110, computer 112, telephone 114 (which may be wired or wireless), a voicemail account, etc. The means and methods of communication employed by computer 104 are not limited to those now known; communication mechanisms developed hereafter may also be employed.

Thus, in the embodiment of the invention depicted in FIG. 1, a user may receive a first electronic communication, in virtually any form, and by selecting an entity identifier included in the communication initiate a second communication, again in virtually any form, with the associated entity.

As already mentioned, the first communication may be parsed or scanned to locate an entity identifier, which could not only comprise a predetermined sequence of characters or signals, but could also comprise a sequence that meet any definable patterns or rules. And, with the entity identifier, the system may enable appropriate methods of communication and/or may lookup or retrieve other methods of communicating with the entity or other information concerning the entity.

In one embodiment of the invention a user may set one or more configuration parameters or options. For example, the system may include a browser plug-in or application module having one or more settings that are user-adjustable. Thus, a user may be able to, or required to, provide default billing information (e.g., credit or debit card number, bank account, telephone number), personalization information (e.g., specifying how the user should be identified to the entity being contacted or how the user may be contacted), a preferred method of contacting an entity associated with an identifier selected by the user, etc.

Figure 2:
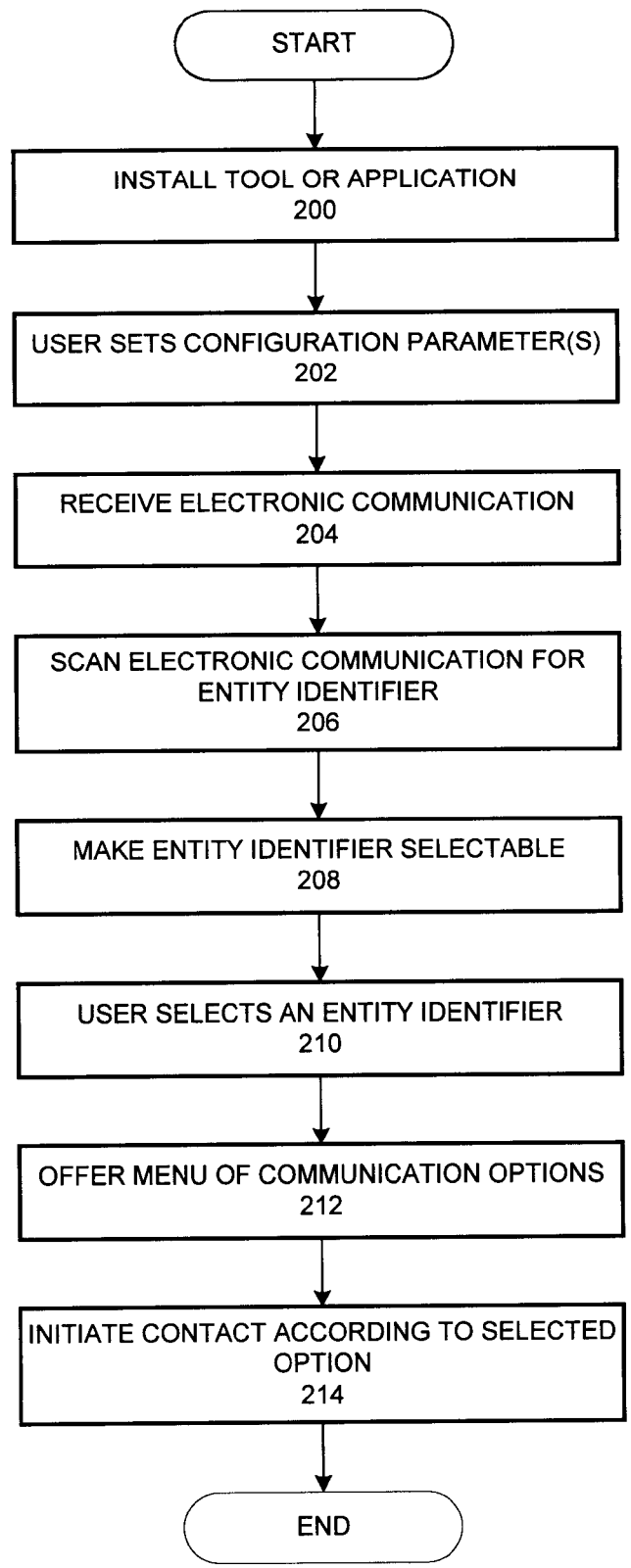
FIG. 2 is a flowchart illustrating one method of initiating contact between a computer user and another entity in response to the user's selection of an entity identifier in an electronic communication received by the user in accordance with an embodiment of the invention.

FIG. 2 is a flowchart demonstrating one method of initiating contact with an entity identified in an electronic communication according to one embodiment of the invention.

In state 200, a system tool or application is installed on a user's computer. In one embodiment the tool comprises a plug-in installed in a web browser, electronic mail application or other application. In other embodiments the tool may comprise a macro, a program module that can be linked to an application, or some other set of computer-executable instructions.

In state 202 the user may set one or more parameters associated with the tool. For example, the user may provide a default method of being billed (e.g., through a credit or debit card, his or her telephone number) for communications initiated through an embodiment of the invention. The user may also provide his or her electronic mail address, voicemail box number, or other means of contacting him or her. Further, the user may specify a preferred method of contacting an entity, which method may differ according to the type of entity identifier the user selects from an electronic communication. For example, if an entity identifier the user selects is a telephone number, he or she may set the default option to establish a voice connection with the entity. For an entity identifier that comprises the name of the entity, the user may prefer to send an electronic mail message if the entity's electronic mail address is available.

Although the user may normally receive a menu of communication options when he or she selects an entity identifier, a default option may automatically be acted on if the user does not make a selection from the menu, or the default option may be listed first, or the default option may be applied if the user employs a special or alternate method of selecting the entity identifier (e.g., by double clicking or holding down a key while clicking on it).

In one embodiment of the invention, if an entity identifier is ambiguous or could be interpreted to have different meanings or be associated with multiple entities, multiple communication options of the same type (e.g., telephone numbers, electronic mail addresses) may be offered, from which the user may select one or more. For certain types of identifiers (e.g., telephone numbers), the system may be able to resolve any ambiguity based on the content of the electronic communication, history of communications in which the user has participated, etc. For example, if only seven digits of a telephone number are included in the identifier, the system may determine the correct area code from the communication or prompt the user to choose between multiple candidates.

Other features and options may also be configurable by a user, such as which types of electronic communications should or should not be scanned for entity identifiers, whether data (e.g., information for contacting an entity) should be stored locally or remotely (e.g., on a network server), etc.

In state 204 an electronic communication is received at or generated on the user's computer. The electronic communication may comprise audio, video, text or any combination of these. Thus, it may be an electronic mail message, a sound file, a video clip, a word processing or spreadsheet document, a database, etc. The electronic communication may be received via virtually any means, such as through a voice or data network, via facsimile, etc.

Upon receipt of the electronic communication, in state 206 the system tool automatically scans and/or parses it to locate any entity identifiers or indicators that may be embedded in the communication. As described above, the tool may search for specific names, addresses (e.g., electronic mail, network, street), telephone numbers, etc., and/or may search for patterns of characters, sounds, video elements or signals that are likely to comprise a meaningful entity identifier.

The tool may use a database, PIM, address book or other collection of data to determine sequences and/or patterns that should be searched for. Further, the tool may use the database to lookup further information concerning an entity identifier, or possible entity identifier, that is located. For example, if a name of an entity is found, the tool may retrieve a telephone number, electronic mail address or other information related to the entity. In one embodiment of the invention the tool may access a network resource (e.g., an Internet version of the white or yellow pages) to identify entities and/or retrieve information to be used to contact an entity.

In state 208 an entity identifier located in the electronic communication is made selectable or clickable. Illustratively, this may involve programming within the application, user interface or operating system that is being executed on the user's computer system. In an embodiment of the invention that is compatible with a version of Microsoft Corporation's Windows operating system, the appropriate Windows programming tools may be invoked. In one embodiment of the invention the system may register an event that is fired or identified when a user clicks on an entity identifier.

In state 210 the user selects an entity identifier. In one embodiment of the invention a user may select a sequence or pattern of characters, symbols, sounds, video elements or other signals that the system did not recognize as an entity identifier. For example, a name or alias of an entity may appear in the electronic communication but may not be recognized by the system tool (e.g., because it is not included in the database that the tool uses as a reference). By selecting the unrecognized identifier, the user indicates to the system that it should perform some additional processing or take additional effort to attempt to recognize the identifier. The system may therefore perform an additional search to locate information about (e.g., means of contacting) the entity. The system may, for example, search another database or employ a search engine to search multiple network locations.

Based on the user's selection (i.e., of an entity identifier that was automatically recognized or suggested by the user), the system retrieves information for one or more methods of contacting the entity. This may include a telephone number, electronic mail address, network address, or other data, including the entity identifier itself. Multiple telephone numbers, addresses or other contact methods may be offered or suggested if the entity identifier is ambiguous or has multiple meanings, connotations or associated entities.

In state 212 the system offers the user a list or menu of options for contacting or communicating with the entity or taking other action. The options that are presented may be determined by the user's preferences that were specified, the form of the selected entity identifier (e.g., whether it was a telephone number, a name, an address), and/or the information retrieved by the system concerning the entity.

In state 214 the user selects an option and the system initiates contact with the entity using the specified means or takes whatever other action may be associated with the option. Thus, the system may initiate or facilitate a voice connection, a facsimile transmission, a voicemail or electronic mail message, etc.

A voice connection may be established, for example, by first telephonically connecting the system to the user and then connecting the user to the destination entity. In one alternative embodiment of the invention, a voice connection may be established through VoIP (Voice over Internet Protocol), wherein the user employs appropriate input and output equipment (e.g., a microphone and speakers) coupled to his computer system to communicate through a similar set of equipment at the entity's end. In another embodiment, the user may record a voicemail message or other audio or video file that the system can deliver to the entity. In yet another embodiment the system could review a voicemail left by a user and allow or prompt the recipient of the voicemail to connect to a telephone number mentioned in the voicemail.

Further, and because of the various information the system retains concerning the entity, the user may initiate a form of communication different from that reflected in the entity identifier. Thus, operation of an embodiment of the invention may involve manipulation or use of the entity identifier, perhaps to retrieve reverse lookup information or other related data. Further if information is incomplete (e.g., if the entity identifier only includes seven digits of a telephone number), the system may attempt to determine the correct area code or provide a complete telephone number.

The procedure depicted in FIG. 1 and described above illustrates just one embodiment of the invention. Other procedures may be developed that are comparable to this procedure without exceeding the scope of the invention.

In one alternative embodiment of the invention HTML or other tags or protocols facilitate the system's ability to make telephone numbers, electronic mail addresses, network addresses, voicemail boxes and other communication mechanisms selectable. For example, a new tag such as "CALLTO" could be applied in electronic communications that include an entity identifier in the form of a telephone number. The user' application or tool (e.g., a web browser) would be configured to recognize the tag and take appropriate action (e.g., establish a voice or VoIP connection to the telephone number) if the user selects the identifier.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method of assisting a user with initiating follow-up communications responsive to a received electronic message, comprising operations of:

responsive to receiving an electronic message, a user's computer determining whether the message contains any party-specific indicia representing candidates for potential follow-up communications, the determining operation performed by scanning the message for at least one of the following: (1) message content matching one or more prescribed codes, (2) message content exhibiting one or more prescribed formats;

responsive to the message containing any party-specific indicia, the user's computer prompting the user to initiate follow-up communications by performing operations including displaying a representation of one or more parties associated with each item of party-specific indicia contained in the message;

responsive to user selection of one or more displayed parties, initiating communications with each selected party.

2. The method of claim 1, wherein said received electronic message comprises at least one of the following: a text document, an e-mail message, a sound file, a video file, a machine-readable data file.

3. The method of claim 1, the operation of the user's computer prompting the user to initiate follow-up communications additionally comprising:

attempting to resolve any ambiguity in associating parties with party-specific indicia by considering one or more of the following: other content of the electronic message, historic activity of the user in initiating past electronic communications, historical activity of the user in receiving electronic messages.

4. The method of claim 1, the operation of the user's computer prompting the user to initiate follow-up communications additionally comprising:

obtaining user input to resolve ambiguity as to which party is associated with an item of party-specific indicia.

5. The method of claim 1, the operation of initiating communications with the selected party comprising at least one of the following:

the user's computer initiating a voice-over-internet-protocol (IP) call to the party;

the user's computer utilizing three-way calling to form a telephone connection between the party and the user;

the user's computer placing a telephone call to the party, and when the call is answered, playing a voice message;

transmitting an e-mail to the party;

sending a facsimile message to the party.

6. The method of claim 1, where:

the operations further include, in association with each displayed party, the user's computer additionally displaying one or more one user-selectable modes for initiating communications with the displayed party;

the operation of initiating communications with the selected party is performed utilizing the selected communications mode.

7. The method of claim 1, where:

the operations further comprise, before receiving the electronic message, the user's computer receiving user preferences indicating preferred modes of communication for each of various parties;

the operation of initiating communications with the selected party is performed utilizing the preferred communications mode for that party.

8. The method of claim 1, where:

the operations further comprise, before receiving the electronic message, the user's computer receiving user preferences as to a form of identifying the user in future communications;

the operation of initiating communications with the selected party is performed so as to identify the user utilizing the preferred form.

9. The method of claim 1, where:

the operations further comprise, before receiving the electronic message, the user's computer receiving user pre-designation of one or more payment sources for future communications;

the operation of initiating communications with the selected party employs one of the pre-designated payment sources in the event payment is required to conduct the communications.

10. The method of claim 1, wherein each item of party-specific indicia comprises at least one of the following: a telephone number, an e-mail address, a uniform resource locator, an instant messaging identifier, a network address.

11. A signal-bearing medium tangibly embodying a program of machine-readable instructions executable by a user's computer to perform operations for assisting the user with initiating follow-up communications responsive to a received electronic message, the operations comprising:

responsive to receiving an electronic message, a user's computer determining whether the message contains any party-specific indicia representing candidates for potential follow-up communications, the determining operation performed by scanning the message for at least one of the following: (1) message content matching one or more prescribed codes, (2) message content exhibiting one or more prescribed formats;

responsive to the message containing any party-specific indicia, the user's computer prompting the user to initiate follow-up communications by performing operations including displaying a representation of one or more parties associated with each item of party-specific indicia contained in the message;

responsive to user selection of one or more displayed parties, initiating communications with each selected party.

12. Logic circuitry comprising multiple interconnected electrically conductive elements configured to perform operations for assisting a user with initiating follow-up communications responsive to a received electronic message, the operations comprising:

responsive to receiving an electronic message, a user's computer determining whether the message contains any party-specific indicia representing candidates for potential follow-up communications, the determining operation performed by scanning the message for at least one of the following: (1) message content matching one or more prescribed codes, (2) message content exhibiting one or more prescribed formats;

responsive to the message containing any party-specific indicia, the user's computer prompting the user to initiate follow-up communications by performing operations including displaying a representation of one or more parties associated with each item of party-specific indicia contained in the message;

responsive to user selection of one or more displayed parties, initiating communications with each selected party.

13. A communications apparatus, comprising:

means for storage;

means for communications;

processing means for assisting a user with initiating follow-up communications responsive to a received electronic by performing operations comprising:

responsive to receiving an electronic message, determining whether the message contains any party-specific indicia representing candidates for potential follow-up communications, the determining operation performed by scanning the message for at least one of the following: (1) message content matching one or more prescribed codes, (2) message content exhibiting one or more prescribed formats;

responsive to the message containing any party-specific indicia, prompting the user to initiate follow-up communications by performing operations including displaying a representation of one or more parties associated with each item of party-specific Indicia contained in the message;

responsive to user selection of one or more displayed parties, initiating communications with each selected party.

14. A communications apparatus, comprising:

digital data storage;

one or more communications modules;

coupled to the storage and communications modules, a processor programmed to assist a user with initiating follow-up communications responsive to a received electronic by performing operations comprising:

responsive to receiving an electronic message, determining whether the message contains any party-specific indicia representing candidates for potential follow-up communications, the determining operation performed by scanning the message for at least one of the following: (1) message content matching one or more prescribed codes, (2) message content exhibiting one or more prescribed formats;

responsive to the message containing any party-specific indicia, prompting the user to initiate follow-up communications by performing operations including displaying a representation of one or more parties associated with each item of party-specific indicia contained in the message;

responsive to user selection of one or more displayed parties, initiating communications with each selected party.

15. The apparatus of claim 14, further comprising a database containing the prescribed codes, the prescribed formats, and identities of parties associated with the party-specific indicia.

* * * * *